(12) United States Patent
Bakir et al.

(10) Patent No.: US 12,508,785 B2
(45) Date of Patent: Dec. 30, 2025

(54) COMPOSITE PART PRODUCTION SYSTEM (71) Applicant: TUSAS—TURK HAVACILIK VE UZAY SANAYII ANONIM SIRKETI, Ankara (TR)

(72) Inventors: Mete Bakir, Ankara (TR); Yakup Bay, Ankara (TR)

(73) Assignee: TUSAS—TURK HAVACILIK VE UZAY SANAYII ANONIM SIRKETI, Ankara (TR)

(*) Notice: Subject to any disclaimer, the term of this patent is extended or adjusted under 35 U.S.C. 154(b) by 223 days.

(21) Appl. No.: 18/020,776

(22) PCT Filed: Apr. 27, 2021

(86) PCT No.: PCT/TR2021/050392
§ 371 (c)(1),
(2) Date: Feb. 10, 2023

(87) PCT Pub. No.: WO2022/046003
PCT Pub. Date: Mar. 3, 2022

(65) Prior Publication Data
US 2023/0302746 A1 Sep. 28, 2023

(51) Int. Cl.
B29C 70/54 (2006.01)
B29C 51/26 (2006.01)
B29C 70/46 (2006.01)

(52) U.S. Cl.
CPC .......... *B29C 70/541* (2013.01); *B29C 51/262* (2013.01); *B29C 70/46* (2013.01)

(58) Field of Classification Search
CPC ..... B29C 51/261; B29C 51/262; B29C 53/04; B29C 31/08; B29C 55/20; B29C 70/541;
(Continued)

(56) References Cited

U.S. PATENT DOCUMENTS 3,574,807 A * 4/1971 Heavener ............... B29C 53/04
264/296
4,975,236 A * 12/1990 MacLachlan ......... B29C 51/262
264/294

(Continued)

FOREIGN PATENT DOCUMENTS

CN 102277927 A 12/2011
CN 204077015 U 1/2015
(Continued)

OTHER PUBLICATIONS

International Search Report and Written Opinion for PCT application No. PCT/TR2021/050392, mailed Sep. 7, 2021.
(Continued)

*Primary Examiner* — Susan D Leong
*Assistant Examiner* — Jennifer L Groux
(74) *Attorney, Agent, or Firm* — Notaro, Michalos & Zaccaria P.C.

(57) ABSTRACT

A composite part production system is disclosed which includes a body. A first mold is located on the body. A second mold is located on the body in a form-fitting manner with the first mold and allows a composite plate to be formed by overlapping on the first mold under temperature and pressure. A frame is located on the body and allows the composite plate to be transported to the first mold and/or the second mold by holding the composite plate.

5 Claims, 7 Drawing Sheets (58) Field of Classification Search
CPC ..... B29C 70/543; B29C 51/264; B29C 51/04;
B29C 51/08; B29C 51/082; B29C 51/18;
B29C 70/46; B29C 70/56; B29B 11/002;
B23Q 3/1543; B25J 15/0608; B66C 1/06;
B32B 38/1866; B21D 43/18
See application file for complete search history.

(56) References Cited

U.S. PATENT DOCUMENTS

| | | | | |
|---|---|---|---|---|
| 5,377,520 | A | * | 1/1995 | Thoms .................. B21D 53/24 72/361 |
| 2006/0284349 | A1 | * | 12/2006 | Castiglioni ........... B29C 51/262 264/553 |
| 2010/0201468 | A1 | * | 8/2010 | Pohl .................... B25J 15/0608 335/291 |
| 2014/0072396 | A1 | * | 3/2014 | Rankin ................. B65G 49/00 414/796.4 |
| 2018/0207853 | A1 | * | 7/2018 | Drexler ............... B29C 65/4835 |
| 2022/0063174 | A1 | * | 3/2022 | Arahata ............... B29C 51/262 |

FOREIGN PATENT DOCUMENTS

| | | | | |
|---|---|---|---|---|
| CN | 106042583 A | | 10/2016 | |
| DE | 2418445 A1 | * | 10/1975 | |
| DE | 102009016215 A1 | * | 10/2010 | ............. B21D 22/02 |
| DE | 102012019915 A1 | | 4/2014 | |
| EP | 2130663 A1 | * | 12/2009 | ............. B29C 33/12 |
| GB | 2187132 A | * | 9/1987 | ........... B29C 51/262 |
| WO | WO-2020138340 A1 | * | 7/2020 | ............. B29C 51/04 |

OTHER PUBLICATIONS

International Preliminary Report on Patentability, completed Sep. 15, 2022.
Demand/Request for Preliminary Examination dated Jun. 27, 2022.
International Application Status Report generated Jan. 31, 2023.

* cited by examiner

COMPOSITE PART PRODUCTION SYSTEM

The present invention relates to systems in which composite plates are formed.

Production of fiber-reinforced polymer matrix composites have become more and more important due to the need for materials with features such as high mechanical strength, corrosion resistance, and lightness for the aviation, aerospace and automotive industries. In fiber-reinforced polymer matrix composites, the matrix material is generally thermoplastic or thermoset polymers.

Thermoplastic polymers differ from conventional thermoset polymers by having the ability to change form under the effect of heat due to their chemical properties. Thanks to this, thermoplastic matrix composites can be formed easily and quickly by thermoforming method without requiring a long-term thermal curing process in autoclave, generally by using a hydraulic press, under temperature and pressure between male and female molds.

German patent application DE102012019915A1, which is included in the known-state of the art, discloses a modular transport means that can be used in the composite part manufacturing process. The transport means can be modified according to the shape of the part planned to be produced by the manufacturer.

Thanks to a composite part production system according to the invention, a more resistive end product is obtained in the part production performed by thermoforming process, regardless of geometric disadvantages of parts with certain geometries.

Another object of the present invention is to provide a more effective, efficient, practical and efficient production process in the production of composite parts by thermoforming method.

The composite part production system realized to achieve the object of the invention and defined in the first claim and the claims dependent thereon comprises a first mold which has a male form and located on the body; at least a second mold which has a female form, located on the body such that it is opposite the first mold in a formfitting manner, and allows the composite plate to be formed under temperature and pressure when the second mold matches with the first mold; a frame located on the body and allowing the composite plate to be transported to the first mold and/or the second mold by attaching the plate therein.

The composite part production system of the invention comprises a frame which is folded when the plate is moved onto the first mold such that it allows the plate to almost completely overlap with the first mold, thus allowing the plate to take the shape of the first mold more effectively.

In an embodiment of the invention, the composite part production system comprises an arm which is located at the body and allows the frame to move on the body by holding the frame.

In an embodiment of the invention, the composite part production system comprises a plurality of electromagnets located on the arm and/or frame and allowing the grip between the arm and/or the frame to be made in an adjustable manner.

In an embodiment of the invention, the composite part production system comprises a slot located on the frame; at least one pin that is removably located on the slot; a plurality of elements which rotate about an axis on which the pin extends, thus allowing the frame to be folded.

In an embodiment of the invention, the composite part production system comprises a first element located on the frame; a second element which can rotate with the first element about the axis on which the pin extends.

In an embodiment of the invention, the composite part production system comprises a first electromagnet which is located opposite the first element and allows the first element to be gripped by electromagnetic force; a second electromagnet which is located opposite the second element and allows the second element to be gripped by electromagnetic force.

In an embodiment of the invention, the composite part production system comprises a first position in which the arm grips the first element and the second element by the electromagnetic force on the first electromagnet and the second electromagnet a second position in which the magnetic force on the second electromagnet releases the second element when the arm is brought on the first mold and/or the second mold such that the second element is moved into the second position by rotating relative to the first element with the effect of gravity about the axis where the pin extends; a frame which folds the plate while moving from the first position to the second position, allowing the plate to be placed on the first mold and/or the second mold in a more form-fitting manner.

In an embodiment of the invention, the composite part production system comprises a transport means which allows the frame to be transported up to the place where it is opposite the arm located on the body.

In an embodiment of the invention, the composite part production system comprises a control unit which allows the electrical current values, which generate the magnetic field on the first electromagnet and/or second electromagnet when the plate is moved onto the first mold, to be adjusted at least partially different from each other.

In an embodiment of the invention, the composite part production system comprises a frame which can be attached or removed by means of pin connection points, thus adjusted by the manufacturer according to size of the composite part to be produced.

In an embodiment of the invention, the composite part production system comprises at least one rail line which is located on the body and allows the arm gripping the frame to be moved onto the first mold and/or the second mold.

The composite part production system realized to achieve the object of the present invention is illustrated in the attached drawings, in which.

All the parts illustrated in figures are individually assigned a reference numeral and the corresponding terms of these numbers are listed below:

1. Composite part production system
2. Body
3. First mold
4. Second mold

5. Frame
6. Arm
7. Electromagnet
   701. First electromagnet
   702. Second electromagnet
8. Pin
9. Element
   901. First element
   902. Second element
10. Transport means
11. Control unit
12. Rail line
(P) Plate The composite part production system (1) comprises a body (2); a first mold (3) which is located on the body (2); a second mold (4) which is located on the body (2) in a form-fitting manner with the first mold (3), and allows the plate (P) to be formed by overlapping on the first mold (3) under temperature and pressure; a frame (5) which is located on the body (2) and allows the composite plate (P) to be transported to the first mold (3) and/or the second mold (4) by holding the plate (P) (FIG. 1).

Figure 1:
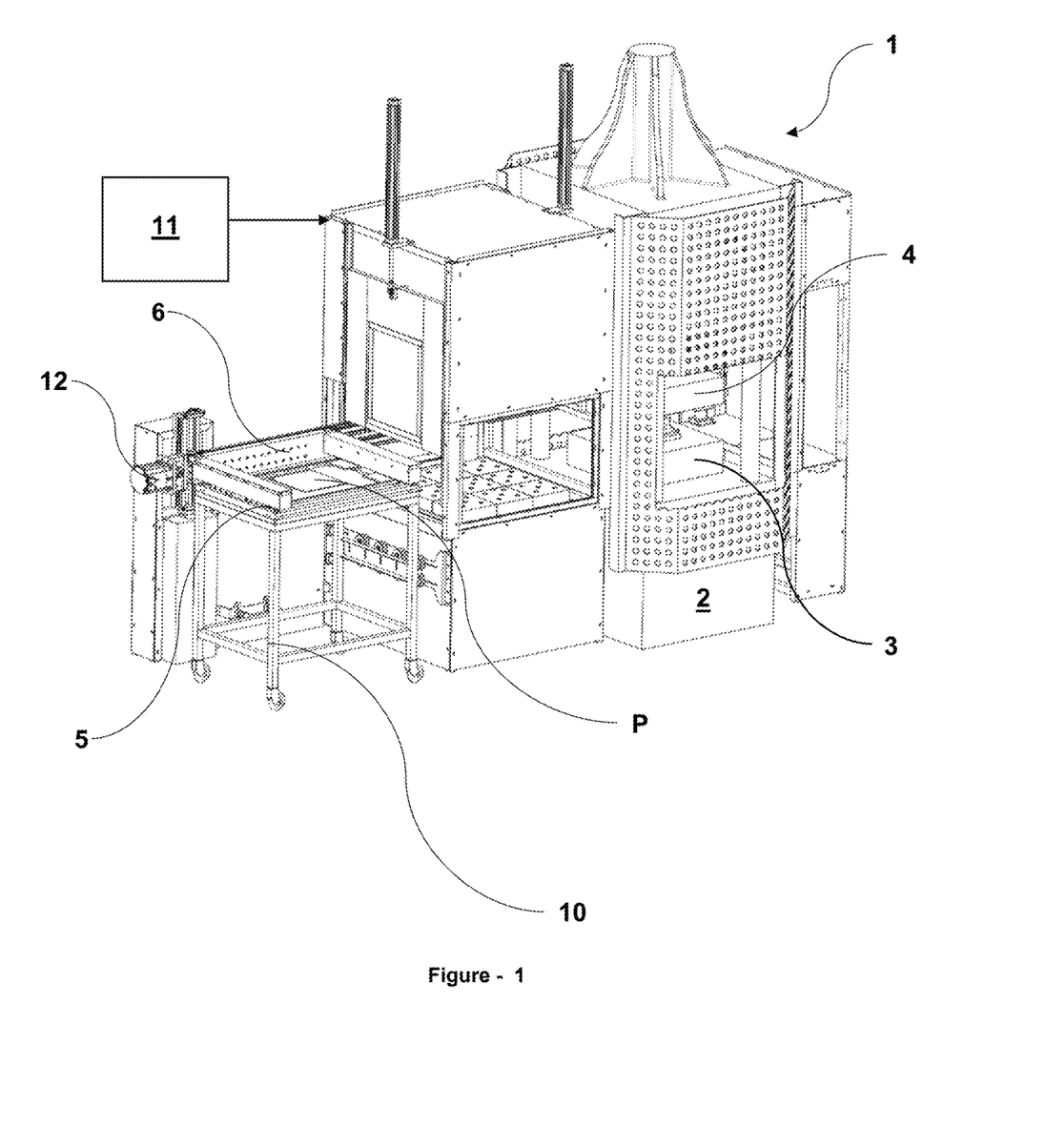
FIG. 1 is a perspective view of the composite part production system.
Figure 2:
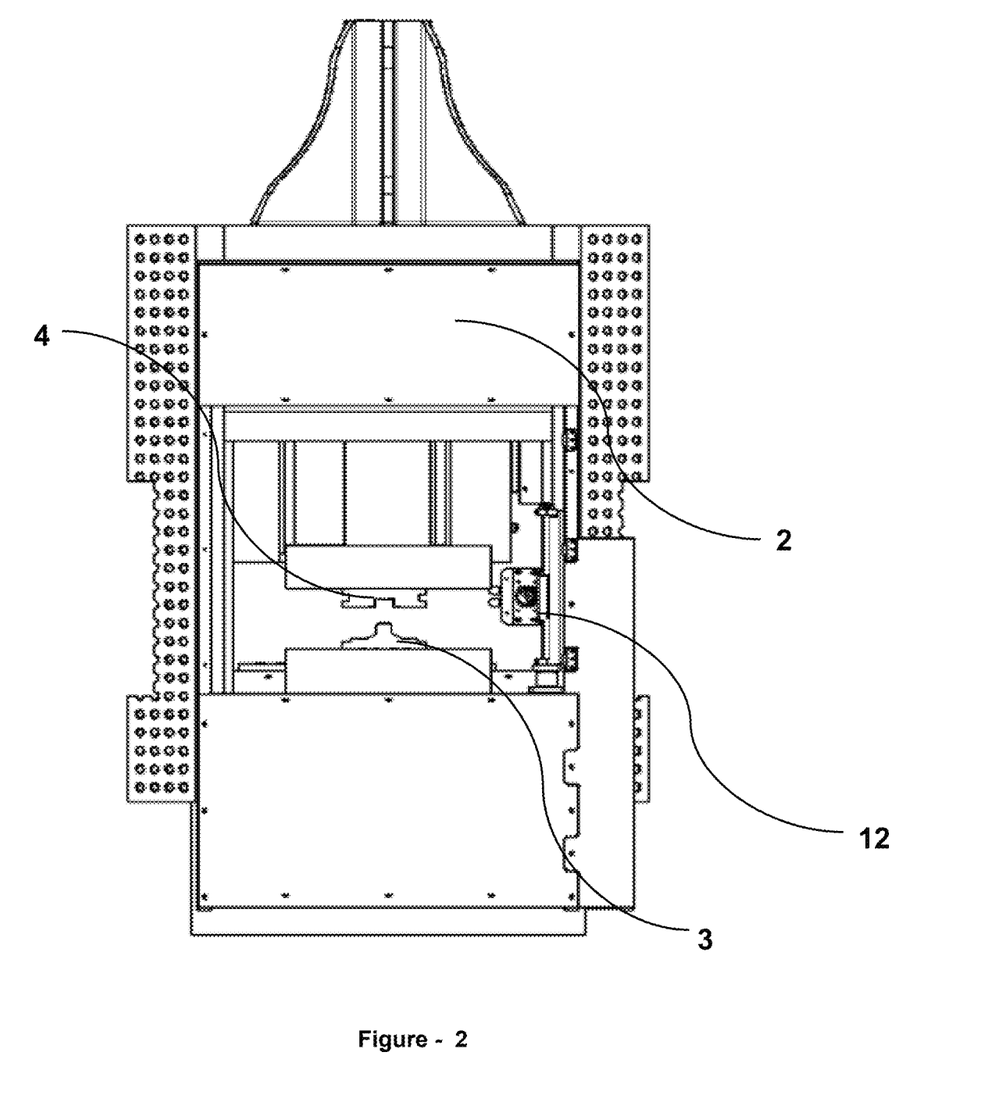
FIG. 2 is a side schematic view of the body, first mold, second mold and rail line.

The composite part production system (1) of the invention comprises a frame (5) which is folded when the plate (P) is moved onto the first mold (3) and/or second mold (4) and allows the plate (P) to be placed on the first mold (3) and/or the second mold (4) such that it almost completely takes the final form desired by the manufacturer (FIG. 1).

The plate (P) is attached to the frame (5) by the manufacturer. The plate (P) is preheated together with the frame (5). In the preheating process, the plate (P) is heated above its melting point temperature (Tm). Once the plate (P) is above the melting point temperature as a result of heating process, it is moved onto the first mold (3) together with the frame (5), the first mold (3) being a male mold. When the plate (P) is moved onto the first mold (3), it has a temperature above the glass transition temperature (Tg) that allows the plate (P) to take form. The plate (P) remains between the first mold (3) having a male form and the second mold (4) having a female form, which is located opposite the first mold (3) in a form-fitting manner. The first mold (3) and the second mold (4) close such that they apply heat and pressure to the plate (P) in order for the plate (P) to take their own form. Under temperature and pressure, the plate (P) takes the shape of the first mold (3) and/or the second mold (4). Therefore, forming process to the plate (P) is performed (FIG. 1).

When the frame (5) is moved onto the first mold (3), together with the plate (P) therein, the frame (5) is folded according to the shape of the first mold (3) such that the plate (P) having a temperature above the glass transition temperature (Tg) takes the shape of the first mold (3) and/or the second mold (4). The plate (P) is folded by folding the frame (5). Thus, the plate (P) takes the form of a radius bending edge more effectively (FIG. 1).

In an embodiment of the invention, the composite part production system (1) comprises an arm (6) which is located on the body (2) and allows the frame (5) to be transported to the first mold (3) and/or the second mold (4). The frame (5) transports the plate (P) by means of the arm (6) to the first mold (3) and/or the second mold (4) located on the body (2) (FIG. 1).

Figure 7:
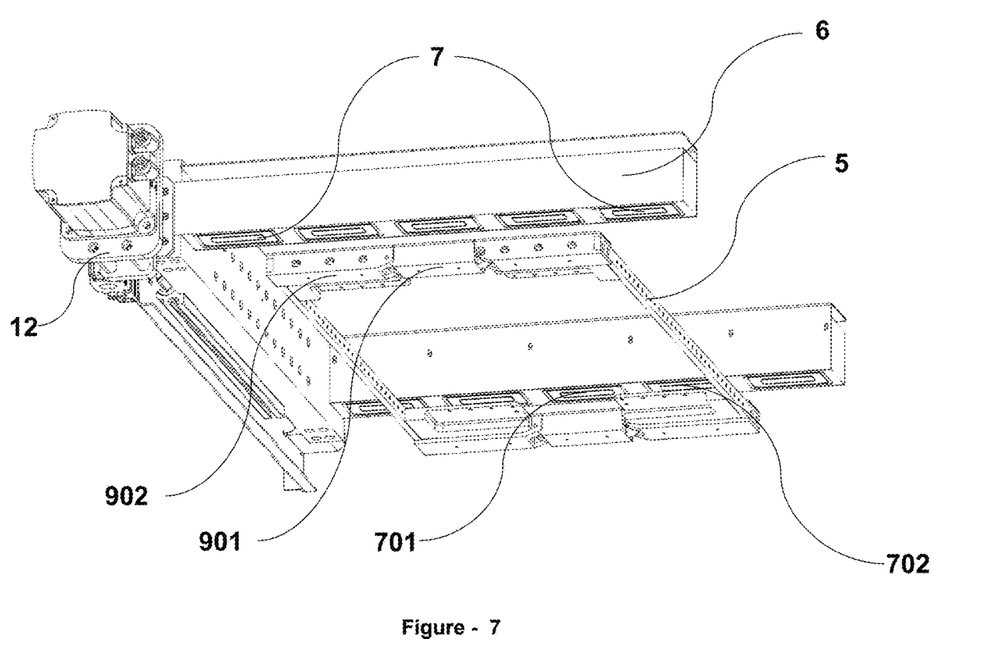
FIG. 7 is a perspective view of the electromagnet, first electromagnet, second electromagnet, frame, first element, second element and arm.

In an embodiment of the invention, the composite part production system (1) comprises at least one electromagnet (7) which is located on the arm (6) and/or the frame (5), and allows the arm (6) to grip the frame (5) by means of magnetic force generated between the frame (5) and the arm (6). The arm (6) can grip the frame (5) more effectively by means of the electromagnet (7) (FIG. 7).

Figure 3:
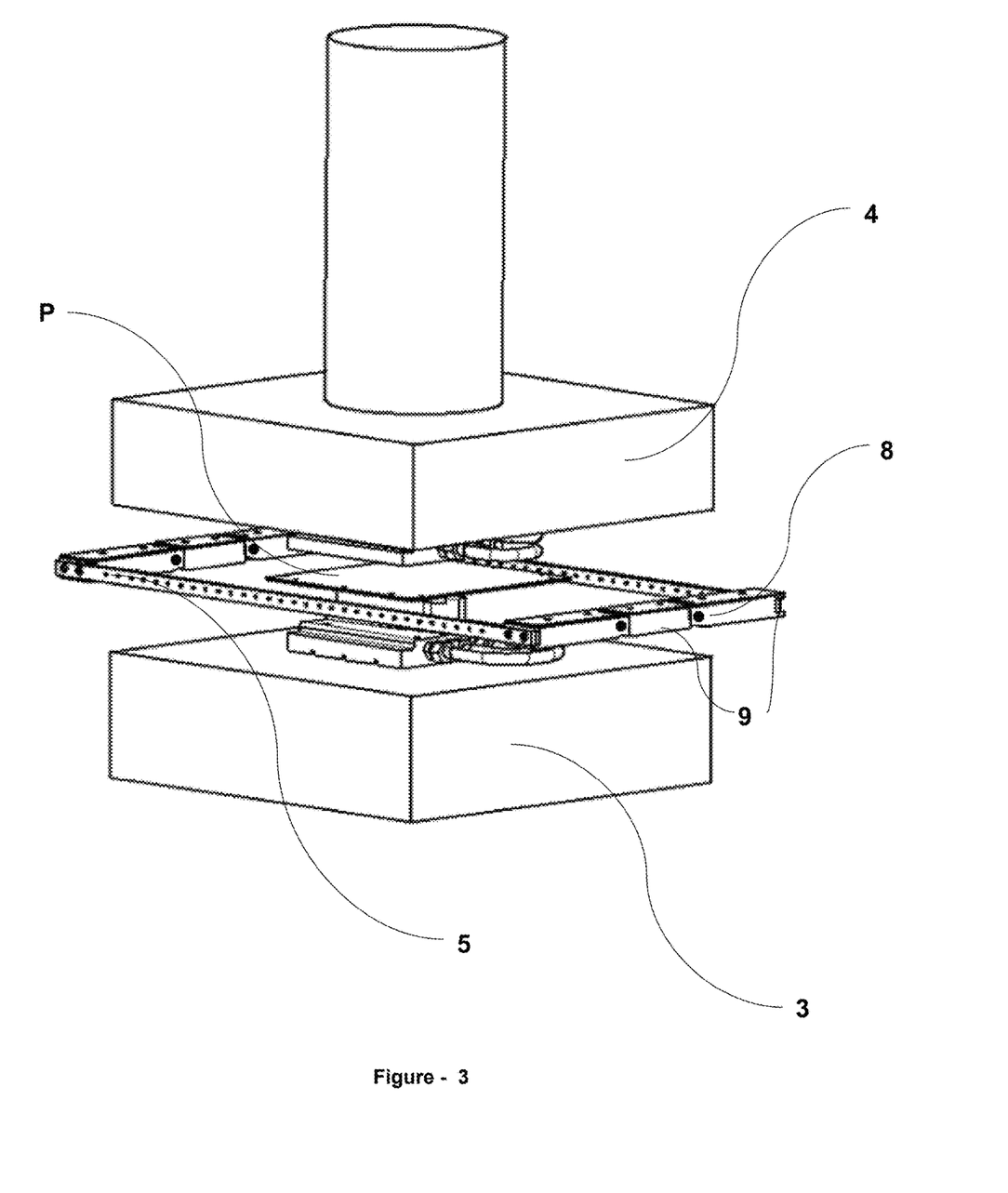
FIG. 3 is a perspective view of the part, first mold, second mold, frame and elements.

In an embodiment of the invention, the composite part production system (1) comprises at least one pin (8) located on the frame (5); and a plurality of elements (9) located on the frame (5) such that they are rotatable relative to each other about an axis where the pin (8) extends. When the plate (P) is on the first mold (3) and/or the second mold (4), the elements (9) are folded at pin (8) connection points according to the shape of the first mold (3) and/or the second mold (4), and the plate (P) is allowed to take the shape of the first mold (3) more effectively (FIG. 1, FIG. 3).

Figure 5:
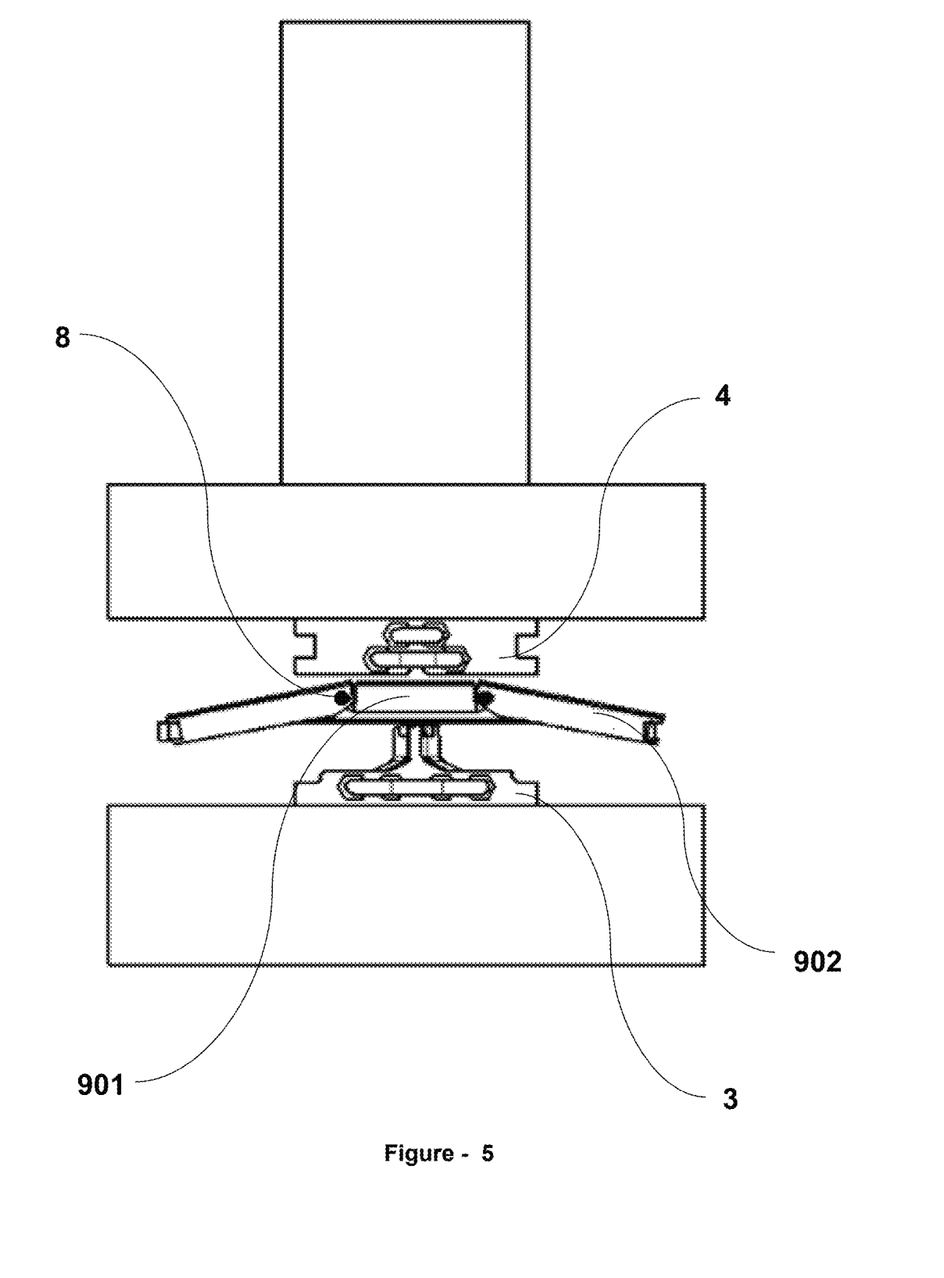
FIG. 5 is a side view of the first mold, second mold, first element, second element and pin.

In an embodiment of the invention, the composite part production system (1) comprises a first element (901) which is located on the frame (5); a second element (902) which is located to rotate relative to the first element (901) about the axis on which the pin (8) extends. The first element (901) is located to rotate relative to the second element (902) about the axis on which the pin (8) extends. Thus, the frame (5) can perform the folding movement (FIG. 5, FIG. 7).

In an embodiment of the invention, the composite part production system (1) comprises a first electromagnet (701) located on the frame (5) and/or arm (6) such that it is opposite to the first element (901), and allowing the first element (901) to be gripped; a second electromagnet (702) located opposite to the second element (902), and allowing the second element (902) to be gripped. The first electromagnet (701) grips the first element (901) while the second electromagnet (702) grips the second element (902). Thus, since the first electromagnet (701) and the second electromagnet (702) can be controlled independently of each other, the folding movement between the first element (901) and the second element (902) can be provided (FIG. 7).

Figure 4:
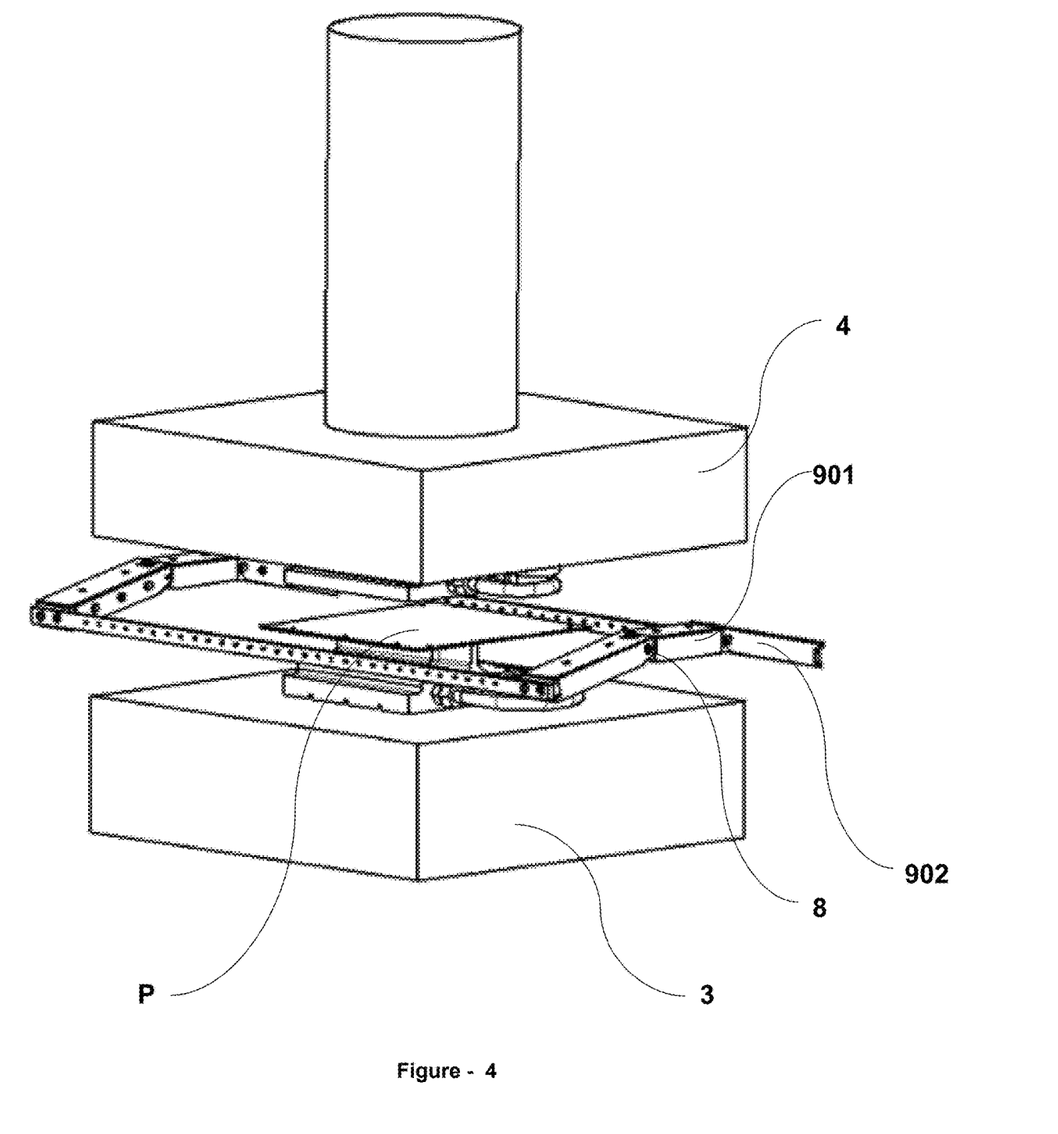
FIG. 4 is a perspective view of the part, first mold, second mold, first element and second element.

In an embodiment of the invention, the composite part production system (1) comprises a first position in which the arm (6) grips the first element (901) and the second element (902) by means of the first magnetic element (701) and the second magnetic element (702); a second position in which current on the second magnetic element (702) is set by the manufacturer to reduce gravitational force of the second magnetic element (702) when the arm (6) is moved onto the first mold (3) and/or the second mold (4), such that the second element (902) is brought into the second position, with the effect of gravity, by moving relative to the first element (901) about the axis on which the pin (8) extends; a frame (5) which is folded while moving from the first position to the second position such that it allows the plate (F) to be placed on the first mold (3) and/or the second mold (4). When the arm (6) brings the frame (5) onto the first mold (3) and/or the second mold (4), the electrical current on the second electromagnet (702) is adjusted to release the second element (902). The first electromagnet (701) continues to grip the first element (901). The second element (902) is released, and then folded by the effect of gravity by making a rotational movement relative to the first element (901) about the axis on which the pin (8) extends. Thus, by folding the plate (P) located in the frame (5), the plate (P) is allowed to take the shape of the first mold (3) and/or the second mold (4) more effectively (FIG. 4, FIG. 7).

Figure 6:
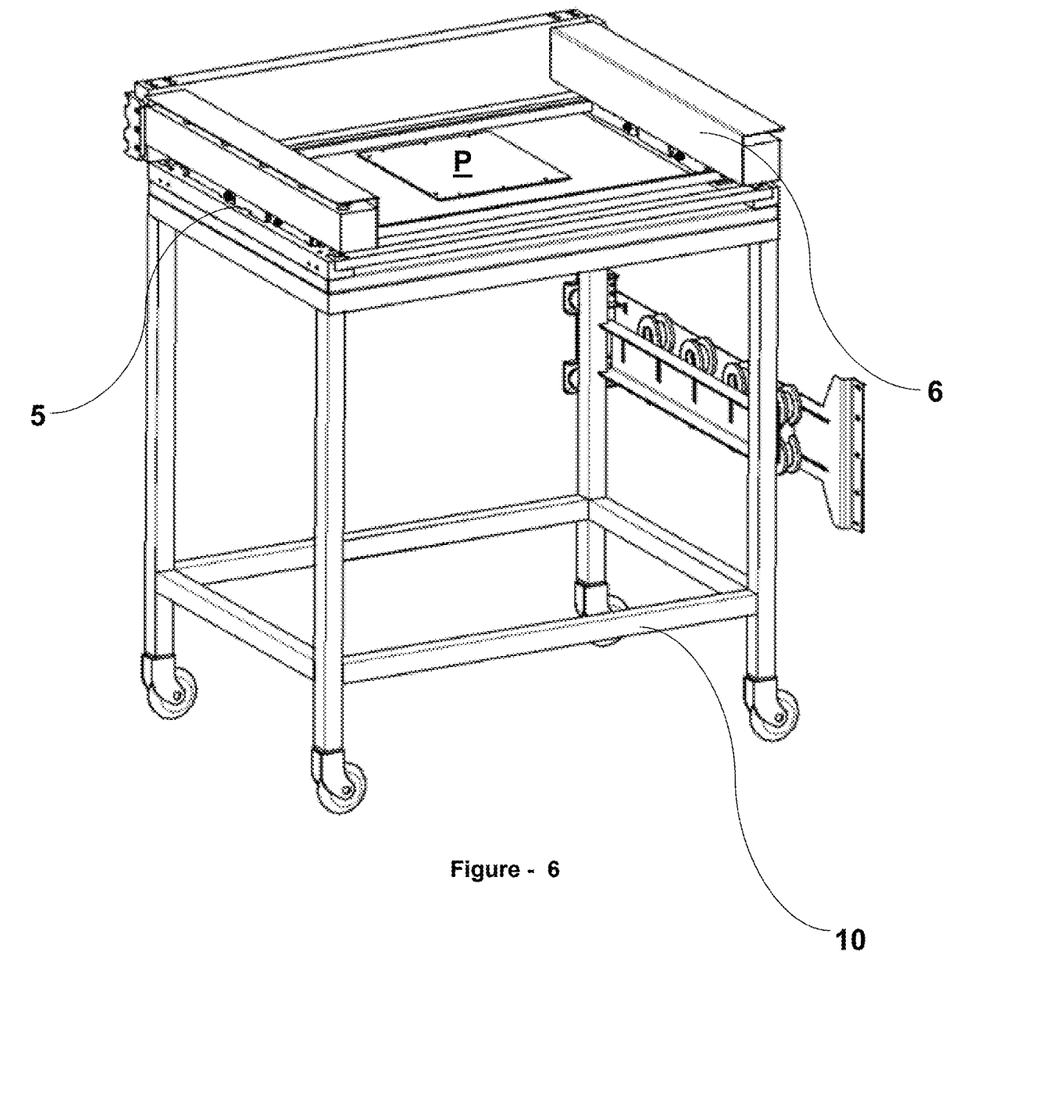
FIG. 6 is a perspective view of the part, frame, arm and transport means.

In an embodiment of the invention, the composite part production system (1) comprises a transport means (10) allowing the part (F), which is removably attached to the frame (5) by the manufacturer, to be transported to the arm (6). The transport means (10) allows the frame (5) to be located such that it is opposite to the arm (6) (FIG. 6).

In an embodiment of the invention, the composite part production system (1) comprises a control unit (11) which allows the electrical current applied on the first electromagnet (701) and/or the second electromagnet (702) located on the body (2) to be controlled at least independently of each other. By means of the control unit (11), the first electromagnet (701) and the second electromagnet (702) can be controlled independently of each other by the manufacturer (FIG. 1, FIG. 7).

In an embodiment of the invention, the composite part production system (1) comprises a pin (8) which allows the elements (9) located on the frame (5) to be attached to the frame (5) in a removable manner, thus enabling modification of the frame (5) according to the form of the part to be produced. Thus, the frame (5) can be modified at the pin (8) connection points according to the geometric shape of the composite part to be produced (FIG. 3).

The invention claimed is:

1. A composite part production system (1) comprising:
a body (2);
a first mold (3) which is located on the body (2);
a second mold (4) which is located on the body (2) in a form-fitting manner with the first mold (3), and allows a plate (P) to be formed by overlapping on the first mold (3) under temperature and pressure;
a frame (5) which is located on the body (2) and allows the plate (P) to be transported to the first mold (3) and/or the second mold (4), wherein the frame (5) is folded when the plate (P) is moved onto the first mold (3) and/or the second mold (4) and allows the plate (P) to be placed on the first mold (3) and/or the second mold (4) such that the plate (P) takes a pre-determined final form;
an arm (6) located on the body (2) and which allows the frame (5) to be transported to the first mold (3) and/or the second mold (4) by gripping the frame (5);
a pin (8) located on the frame (5);
a first element (901) located on the frame (5);
a second element (902) connected to the first element via the pin (8) and configured to rotate relative to the first element (901) around an axis on which the pin (8) extends;
a first electromagnet (701) located on the arm (6) opposite to the first element (901) so that the first electromagnet (701) grips the first element (901) when the first electromagnet (701) is activated when a predetermined electrical current is applied thereto;
a second electromagnet (702) located on the arm (6) opposite to the second element (902) so that the second electromagnet (702) grips the second element (902) when the second electromagnet (702) is activated when the predetermined electrical current is applied thereto;
wherein the frame (5) has a first position in which the arm (6) grips the first element (901) with the first electromagnet (701) and the second element (902) with the second electromagnet (702) when both the first electromagnet (701) and the second electromagnet (702) are activated; and
wherein the frame (5) has a second position in which the arm (6) grips the first element (901) with the first electromagnet (701) and the electrical current applied to the second electromagnet (702) is adjusted from the predetermined electrical current so that, as the arm (6) is moved onto the first mold (3) and/or the second mold (4), the second electromagnet (702) releases the second element (902) so that the second element (902) rotates relative to the first element (901) about the axis on which the pin (8) extends due to an effect of gravity on the second element (902).

2. The composite part production system (1) according to claim 1, comprising a transport means (10) allowing the plate (P), which is removably attached to the frame (5), to be transported to the arm (6).

3. The composite part production system (1) according to claim 1, comprising a control unit (11) which allows the electrical current applied to the first electromagnet (701) located on the body (2) and the electrical current applied to the second electromagnet (702) to be controlled independently of each other.

4. The composite part production system (1) according to claim 1, wherein the pin (8) allows the first element (901) to be attached to the frame (5) in a removable manner.

5. The composite part production system (1) according to claim 1, comprising at least one rail line (12) located on the body (2), on which the arm (6) is movably located, and which allows the frame (5) to move onto the first mold (3) and/or the second mold (4).

* * * * *